United States Patent Office 3,265,873
Patented August 9, 1966

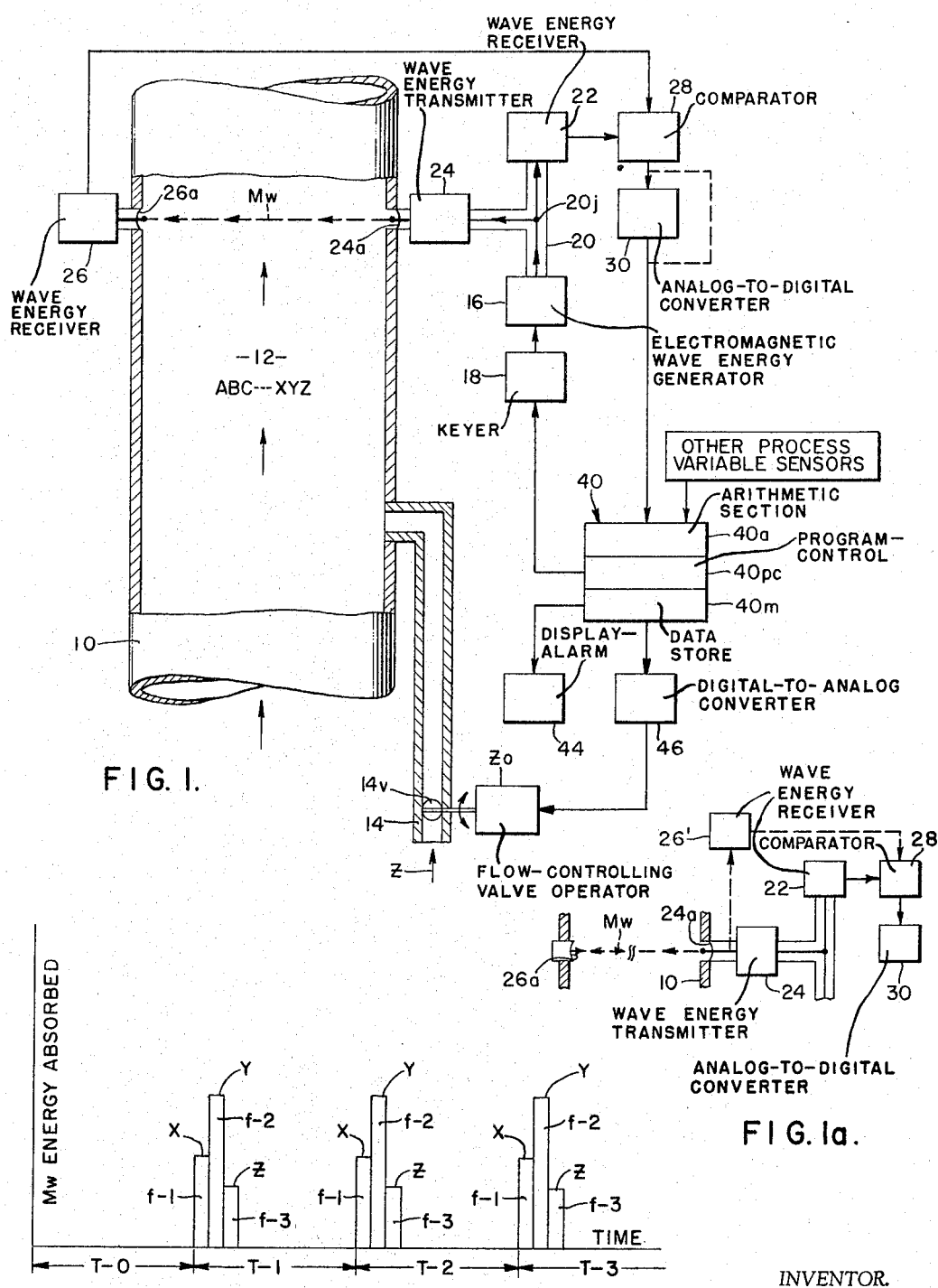
FIG. 1.
FIG. 1a.
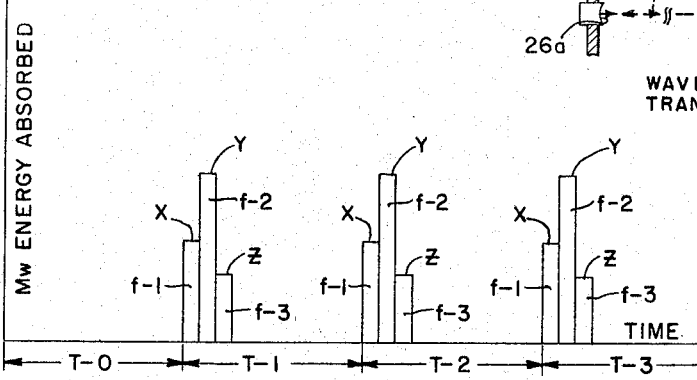
FIG. 2.
INVENTOR.
HAROLD T. SAWYER
BY 
ATTORNEY.

3,265,873
SYSTEM FOR MONITORING AND CONTROL OF MATERIAL IN A CONTINUING PROCESS
Harold T. Sawyer, Los Angeles, Calif., assignor of ten percent to George K. McKenzie and Harry P. Heubner (jointly), New York, N.Y., two percent to Harry P. Heubner, New York, N.Y., and two and one-half percent to Lawrence H. Hoerres, Hollywood, Calif.
Filed Oct. 10, 1961, Ser. No. 144,147
8 Claims. (Cl. 235—151.35)

The invention hereinafter disclosed pertains to methods and systems of apparatus useful in performing at high repetition rates operations including quantitative analyses for specific known substances in a dynamic reaction system and which operations include introduction of materials into a flow path, surveillance and control of reactions between materials and analysis for known substances in reaction zones and in one or more regions beyond a reaction zone, utilizing known phenomena and techniques in the fields of electromagnetic wave energy absorption spectroscopy and digital information storage and processing; and more particularly the invention relates to methods and systems of apparatus for repetitively and automatically performing quantitative electromagnetic wave analyses for known materials or substances at a rapid repetition rate and at a plurality of places or zones along a material flow path or route that may include at least one input zone, at least one reaction zone or region and at least one region beyond the reaction zone, for automatically and repetitively comparing the informational result of the analyses with sets of stored information in and by means of a digital data processing system, and automatically and repetitively at a high rate controlling one or more of the inputs of reacting materials and/or the physical conditions of the reaction zone, whereby substantially continuous surveillance and control in input material, reaction processes and reaction products are attained substantially automatically.

Various means and methods for performing qualitative and quantitative analysis of samples taken from chemicals or substances undergoing processing are known in the art. Some of these utilize optical means such as infra-red or ultra violet light; others use chromatographic techniques and materials, etc. Those known systems and procedures, however, are characterized by the necessity of sampling, that is, withdrawing a sample of the mixture then involved in processing for analysis under controlled conditions such as in a laboratory. Obviously, maximum effectiveness of control of the content of the main body of process material and of the process is impossible using such techniques owing to the time lag between sampling, analysis of the sample, and the application of the indicated corrective measures.

The present invention provides a means and a method for effecting extremely rapid analysis for known components of the process under actual operating conditions at a desired number of locations, and the immediate and automatic application of corrective measures as determined by results of the continually repeated analysis procedures. This the invention accomplishes by utilizing the known principles and techniques of selective absorption of electromagnetic energy within an appropriate frequency spectrum by the known constituents of the process. It is known that each of known materials has a pronounced and characteristic response when penetrated by electromagnetic wave energy. A digital computer or information processor having a store of appropriate data and a program controller for controlling the application to the process of bursts of energy of the known appropriate specific frequencies is utilized to analyze and evaluate data derived by and from these bursts by comparison with stored data. Further, the computer or information processor uses the results of the comparison in rapidly signaling process control factors or instrumentalities to effect appropriate regulation of process input or environment to maintain the process at prescribed or desired composition or other levels. In an exemplary system, electromagnetic wave energy appropriately generated and controlled by a computer-controlled keyer governs the number, frequency and time spacing of bursts of wave energy applied to the process. The transmitted wave energy output of a generator is directed in a beam through a zone or space of interest containing a mixture to be analyzed, to a beam receiver, and concurrently an identical companion beam is directed to a second receiver and is there analyzed for energy and frequency content. The propagated or transmitted portion of the energy, in passing transversely through the zone of interest, if of appropriate composition, undergoes a change due to energy absorption, and the observed change bears a definite functional relationship to the concentration of known process components at that zone.

In that exemplary system the outputs of the two receivers are compared or differentially measured and the difference, corresponding to the absorbed energy, is passed to translating means such as a counter or an analog-to-digital conversion means which converts the data to digital form for use in the computer. The computer is strictly controlled according to a predetermined sequence of operations by its program-control section, and an appropriate register of its arithmetic section is ready for receipt of the derived data. Within the computer the program control means initiates sequential comparison of the incoming data representing frequency or frequencies of energy absorbed and extent of absorption with sets of data stored in its memory section and relating specifically to the known process constituents of interest in the mixture being analyzed. The results of the comparison are preferably translated, as by integrating or averaging means and indicators, into sense-perceptible displays at a monitoring station and are used directly either in digital form or following conversion in a digital-to-analog converter to operate suitable process-control means, such as pressure or temperature control means or stream-inlet control means, or appropriate signal or alarm means, whereby the content or other characteristic of the process may be substantially immediately corrected or changed. As is evident, the computer may be programmed to introduce predetermined changes in the process.

As will be recognized from the foregoing discussion, by proper formulation of the program of the information-processor program-control section the process content of the known materials of interest may be thus selectively made to approach absolute constancy rapidly, or to vary in predetermined steps, or to vary in accordance with a predetermined and ordered program. Since the electromagnetic wave energy generator may be sequenced to emit successive programmed bursts of energy of different frequencies under control of the data processor, an entire program of analyses may be processed in very rapid sequence. Thus, all constituents of interest in the process at any desired number of zones may be analyzed, monitored and controlled, all in a very short time. Since the computer may be made to recycle repetitively, the process control, analysis, and registration of data can be and preferably is a continuous operation.

It is therefore a principal object of the invention to provide improvements in methods and systems for dynamically analyzing and controlling process constituents at at least one zone of interest.

Another object of the invention is to provide means for analyzing constituents of a dynamic process with improved rapidity and without need for sampling.

An additional object of the invention is to provide means for analyzing and controlling more accurately and rapidly known components of a body of processing material under dynamic conditions.

Other objects of the invention will hereinafter be made evident in the appended claims and in the following description of methods and an elementary exemplary physical system of the invention represented in the accompanying drawings.

In the drawings:

FIGURE 1 is a diagrammatic representation of components of the preferred exemplary system in functional array including control and signal flow lines;

FIGURE 1a is a diagrammatic illustration of certain modifications of the system depicted in FIGURE 1; and FIGURE 2 is a diagrammatic representation of electromagnetic energy in repetitive pulses of several frequencies plotted against time.

Referring to FIGURE 1, there is represented at 10 a container in which a mixed stream of process materials A, B, C . . . X, Y, Z flow in the direction indicated by the arrows, this mixture being a random mixture of constituents. For the purpose of this exposition, only one additive or "controlled" constituent will be considered in the interest of conciseness, but it will be understood that the relative proportions of as many as several dozen different constituents (represented by A, B, C . . . X, Y, Z) may be separately analyzed and controlled.

Input flow of the controllable constituent or component Z is by way of input conduit 14 in which is located a valve 14 regulable by a signal-controlled valve operator Zo. An adjustable generator of electromagnetic wave energy 16, keyed and frequency-controlled by a keyer 18, produces electromagnetic wave energy output on a transmission medium here indicated as a line 20. The energy, which in this exemplary example is microwave energy, is produced in pulses or "bursts" as dictated by the keyer 18 which, in turn, is controlled by an information-processor system to be described presently. The output wave energy is divided at a line junction 20j, one portion passing on into a first wave receiver 22 and a second portion being fed to a wave energy transmission means of a directive means 24a which may be located in the process stream or separated from the stream by a suitable window, depending upon the nature of the constituents and nature of the process stream. The energy beam Mw is directed across the process mixture 12 as is indicated and, in doing so, excites molecular constituents of the stream intercepted by it, thereby losing energy in a manner well understood in the art, for example, of microwave spectroscopy. The nonabsorbed component or components of the wave energy beam impinge upon a suitable collecting means (such as a parabolic antenna 26a) forming part of a second wave energy receiver 26.

The wave energy received at receiver 26 and that transmitted directly to receiver 22 are measured in amount and frequency composition at the respective receivers. Signals representative of these values being transmitted to a comparator 28 are subtracted one from the other to produce analog signals representing the differences. As is evident, the respective receivers are so adjusted that if no energy is molecularly absorbed by a stream component the two signals received at 28 are identical and their difference is zero. It follows that a difference output signal from comparator 28 represents by its characteristic frequency and intensity the composition and concentration of a known energy-absorbing constituent in the chemical stream. The analog output signals from comparator 28 are preferably digitized into binary values in an analog-to-digital converter 30 to which those output signals are translated, as is indicated. The digital signal output of converter 30 is translated to an input register of the arithmetic network or section 40a of a digital information processing system 40.

Information processing system 40 may be a general purpose data processor of a known commercial type, or it may be a special purpose computer designed in accordance with known computer techniques especially for the tasks here involved. The computer has a data store or memory 40m, and also includes a program-control means 40pc which may be either self-contained or may rely upon a stored program sequence initially entered into the computer memory and cyclically interrogated for instructions by the program controller according to principles and by means well understood in the information processing arts. The computer memory is provided with a series of sets of data correlated with signals of the type translated from converter 30 whereby the incoming signals are sequentially compared with stored data until an identity is established between the instant incoming information and a set of stored information. In this manner, there is established an identification of a particular chemical component of the stream and the concentration thereof.

Upon identity of the constituent being established, the obtained information pertinent thereto is stored in a reserved section of the computer memory or a suitable recirculating register, and called out in a digital display or alarm device 44, depending upon which result is appropriate. The computer further compares the newly entered information with a determined standard or norm for the particular constituent under examination and determines whether the concentration is at, above, or below this norm as set up in the computer memory, and transmits in response to the comparison and at the programmed time a signal calling out the appropriate process alteration or change such as, for example, a decrease, no change, or an increase of the particular mixture constituent. The thus transmitted signal is preferably converted from binary digital form to analog form in digital-to-analog converter 46 and the converted signal is utilized to adjust, if necessary, a Z-constituent flow-controlling valve operator Zo, the adjustment corresponding to the magnitude of the analog signal to operate valve 14v to decrease, leave set, or increase the input of constituent Z by a corresponding degree.

As is evident to those skilled in the art, other process variables may be sensed by suitable sensors, and the data therefrom fed to the computer as indicated in FIGURE 1, for alteration of the control functions performed by the computer on the process.

From the foregoing exposition, it is evident that each of a plurality of constituents of the chemical stream may be monitored and appropriately controlled by sequentially pulsing the mixture or process with a beam of wave energy with those frequencies corresponding to the characteristic resonant frequencies of the known constituents present and desired to be measured and/or controlled. The program control means of the computer initiates successive generations of energy pulses of these frequencies in rapid successive order by controlling keyer 18 and concurrently makes comparisons of corresponding data stored in the computer memory, and at the proper interval switches the analog signal output of converter 46 to the appropriate valve controller to adjust, if necessary, the input of the respective chemical or process constituent undergoing monitoring in stream 12.

In a modified arrangement of the described system, a wave energy reflector (such as an antenna) is substituted for that at receiver 26, and the propagated wave energy is reflected back to the wave energy propagator (such as antenna 24a), and is translated to a second wave energy receiver 26' whose output is translated to comparator 28 as before. The changes involved in the system are indicated by dotted lines in FIGURE 1a.

As is indicated in FIGURE 2, the computer program controller demarks time intervals during each of which a complete monitoring and comparison cycle of the system occurs. The intervals designated T-0, T-1, T-2, T-3, etc., for example, may each be of the order of a small fraction of a second duration due to the extreme rapidity with which electromagnetic wave transmission and digital computer operations may be accomplished. As depicted, three constituents, X, Y and Z, are detected by absorption of respective electromagnetic wave energy of respective characteristic frequencies F-1, F-2 and F-3 generated and transmitted in succession at the commencement of each program cycle of the computer. The relative momentary magnitudes of energy absorption may be, for example as indicated, representing in each case a measure of the concentration of the respective constituents in the chemical or process stream. Over an extended period of time, e.g., one second, some sensible change in one or more of the magnitudes or measures may occur, but the change from one small fraction of a second to the next is generally too small for coarse graphical illustration and is not apparent in the drawings.

While the particular dynamic chemical composition or process constituent analyzer and control herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A process monitoring and control system comprising: first means, comprising means defining boundaries of a dynamic-process zone; second means, comprising electromagnetic wave energy generating and transmitting means operable to generate and transmit wave energy of at least one determined frequency through at least a portion of said zone, and including first wave energy receiver means arranged to receive transmitted wave energy substantially directly from said generating and transmitting means, and second receiver means arranged to receive electromagnetic wave energy transmitted through said portion of said zone; third means, comprising comparator means, connected to said first and second wave energy receiver means and effective to produce a signal representing the difference between the outputs of the connected receiver means; fourth means, including computer means connected to receive produced signals from said comparator means, said computer means comprising a data store and an arithmetic section and effective to compare data represented by received signals with data in said data store and to produce computer output signals representative of disparity between data represented by received signals and stored data, and said computer means further comprising program-control means effective to cycle the operations of the system repetitively; fifth means, comprising process-control means connected to said computer means and effective in response to the said computer output control signals to change a process-parameter in a sense to decrease said disparity.

2. A process monitoring and control system comprising: means confining a dynamic process to a process region; repetitively acting electromagnetic wave energy means, comprising generating, radiating, and receiver means, constructed and arranged to transmit electromagnetic wave energy indirectly through a portion of said region to a first receiver means and to transmit other wave energy of an identical nature directly to a second receiver means; operative means including comparator means connected to the said receiver means effective to compare the frequency and energy contents of the separately received wave energies and to produce a comparator means output signal representative of wave energy absorbed in said portion of process region; and controlling means, including computer means and computer-controlled process-parameter control means, connected to said comparator means and effective to compare the comparator means output signal with computer-stored signals and effective to control said process-parameter control means to regulate and control a process parameter in dependence upon the comparison between comparator means output signal and computer-stored signals pertinent to the said process parameter, thereby to alter the process in a sense to tend to bring the comparator means output signal into conformity with a computer-stored signal.

3. A system according to claim 2 characterized in that said computer means includes program-control means and means connecting the computer means to the electromagnetic wave energy means effective to cause rapid repetitive cycles of control action.

4. A system according to claim 2 including means connected to said computer means effective to produce a sense-perceptible indication of the results of the computer comparisons.

5. A dynamic process monitoring and control system comprising means for generating pulses of electromagnetic wave energy of various known frequencies, means for propagating bursts of generated wave energy within the range of said frequencies sequentially in a beam at respective known energy levels and directing the beam through known process constituents undergoing processing, other means in the path of the beam and at a distance from said propagating means to receive the residue of the propagated beam not absorbed by the known constituents, means connected to said other means and operable to compare the received beam energy with similar wave energy not passed through the process constituents to derive a comparison signal representing a state of said process, means for comparing the resultant comparison signal with stored signals representing a desired process state, and means for utilizing the variance of the comparison signal from stored signal for adjusting process control means to correct the dynamic process to bring the process state into conformity with the desired state.

6. A dynamic process monitoring and control system comprising means for controlling the supply of known process constituents, means for generating discrete bursts of electromagnetic wave energy within respective different frequency ranges each known to coincide with the characteristic resonant frequency of a known process constituent to be regulated, means for sequentially beaming wave energy bursts through constituents undergoing processing and for receiving the residue of said bursts after traversing said constituents under dynamic processing conditions, means for comparing the residue signals with stored signals representing the respective known constituents if present in the precise amount desired for the process, and means responsive to the magnitude and direction of variance thereof from the predetermined normal value of said stored value for a given constituent to adjust, if necessary, the supply control for that constituent in the proper direction and amount thereby to restore the proportion of that constituent desired in the dynamic process.

7. A dynamic process monitoring and control system as defined in claim 6 characterized in the provision of means for dividing the respective generated wave energy of predetermined frequencies into first and second beams, means for transmitting the first of said beams only through the constituents undergoing processing, means for comparing the residue of said first beam with the second beam and for transmitting a signal representing the difference to said means for comparing the residue signal with said stored signals.

8. A dynamic-process monitoring and controlling system, comprising: means defining boundaries of a processing space; means for changing a process-variable of a process occurring in said space; electromagnetic wave energy producing and transmitting means operable to produce and transmit electromagnetic wave energy of determined frequency along a path through at least a portion of said processing space, and including first receiver means arranged to receive transmitted energy directly from said transmitting means, and including second receiver means arranged to receive energy transmitted along said path; means, comprising comparator means, connected to said first and second receiver means and effective to produce a signal representing the difference between the outputs of the connected receiver means; other means, including computer means connected to receive a said produced signal from said comparator means, said computer means comprising a data store and an arithmetic section effective to compare data represented by a received signal with data in said data store and to produce an output signal representative of disparity between received and stored data; and said computer means further comprising program control means effective to cycle the operations of the system repetitively; and means, comprising process-parameter control means connected to said computer means, effective in response to said output signal to regulate said means for changing a process-parameter, whereby to change the occurring process in the direction toward reducing said disparity.

References Cited by the Examiner

UNITED STATES PATENTS

| | | | |
|---|---|---|---|
| 2,602,835 | 7/1952 | Hershberger | 324—58.5 |
| 2,636,926 | 4/1953 | Wilson et al. | 324—58.5 |
| 2,637,767 | 5/1953 | Hershberger | 324—58.5 |
| 2,745,014 | 5/1956 | Norton. | |
| 2,792,548 | 5/1957 | Hershberger | 324—58.5 |
| 2,824,280 | 2/1958 | Beers. | |
| 2,867,781 | 1/1959 | Tomyasu | 324—58.5 X |
| 3,005,911 | 10/1961 | Burhans | 235—151 X |
| 3,034,718 | 5/1962 | Freitas et al. | 235—151 |

MALCOLM A. MORRISON, *Primary Examiner.*

DARYL W. COOK, *Examiner.*

C. L. WHITMAN, K. W. DOBYNS, *Assistant Examiners.*